United States Patent [19]

Torii et al.

[11] Patent Number: 4,757,870

[45] Date of Patent: Jul. 19, 1988

[54] FOUR WHEEL DRIVE SYSTEM HAVING DRIVING FORCE DISTRIBUTION CONTROL RESPONSIVE TO FRONT AND REAR WHEEL SPEED DIFFERENCE

[75] Inventors: Shuuji Torii, Yokohama; Yuji Kobari; Kiyotaka Ozaki, both of Yokosuka, all of Japan

[73] Assignee: Nissan Motor Co., Ltd., Yokohama, Japan

[21] Appl. No.: 830,015

[22] Filed: Feb. 18, 1986

[30] Foreign Application Priority Data

Feb. 20, 1985 [JP] Japan .................................. 60-33286

[51] Int. Cl.⁴ ............................................. B60K 17/34
[52] U.S. Cl. ...................................... 180/233; 74/866; 180/197; 180/247; 364/424.1
[58] Field of Search ............... 180/233, 197, 247, 248, 180/249; 364/426, 424.1; 74/866; 192/0.052, 0.075, 0.076

[56] References Cited

U.S. PATENT DOCUMENTS

| | | | |
|---|---|---|---|
| 4,420,059 | 12/1983 | Suzuki | 180/248 |
| 4,466,502 | 7/1984 | Sakai | 180/248 X |
| 4,484,653 | 11/1984 | Horikoshi et al. | 180/233 |
| 4,552,241 | 11/1985 | Suzuki | 180/249 |
| 4,562,541 | 12/1985 | Sakakiyama | 180/197 X |
| 4,586,583 | 5/1986 | Yamakawa et al. | 180/247 |
| 4,605,087 | 7/1986 | Ashauer et al. | 180/233 X |
| 4,613,008 | 9/1986 | Hiraiwa et al. | 180/247 |
| 4,651,847 | 3/1987 | Hermanns | 180/248 X |
| 4,664,216 | 5/1987 | Kodama et al. | 180/233 |

FOREIGN PATENT DOCUMENTS

| | | | |
|---|---|---|---|
| 64669 | 11/1982 | European Pat. Off. | 180/197 |
| 12827 | 1/1983 | Japan | 180/233 |
| 58-100132 | 7/1983 | Japan . | |
| 58-139226 | 9/1983 | Japan . | |
| 191822 | 9/1985 | Japan | 180/233 |
| 882786 | 11/1981 | U.S.S.R. | 180/233 |

Primary Examiner—John J. Love
Assistant Examiner—Mitchell J. Hill
Attorney, Agent, or Firm—Foley & Lardner, Schwartz, Jeffery, Schwaab, Mack, Blumenthal & Evans

[57] ABSTRACT

A four wheel drive system of a vehicle has a transfer clutch capable of varying clutch torque transmitted therethrough from an engine to front wheels. The clutch torque is controlled by a driving force distribution control unit in accordance with a front and rear wheel speed difference determined from signals from front and rear wheel speed sensors. Preferably, the control unit controls a distribution ratio of a front wheel driving force to a rear wheel driving force by controlling the clutch torque of the transfer clutch in such a manner that the distribution ratio decreases as the wheel speed difference increases when the wheel speed difference is positive, that is the front wheel speed is higher than the rear wheel speed, and that the distribution ratio increases as the absolute value of the wheel speed difference increases when the wheel speed difference is negative.

8 Claims, 5 Drawing Sheets

FOUR WHEEL DRIVE SYSTEM HAVING DRIVING FORCE DISTRIBUTION CONTROL RESPONSIVE TO FRONT AND REAR WHEEL SPEED DIFFERENCE

BACKGROUND OF THE INVENTION

The present invention relates to a system for controlling the distribution of a driving force between front and rear wheel pairs of a four wheel drive vehicle by varying torque transmitted from an engine to either of the front and rear wheel pairs with a clutch.

A four wheel drive vehicle exhibits a superior ability on a road surface of a low coefficient of friction by dispersing its driving force among front and rear wheels. However, a 4WD vehicle has a disadvantage of a tight corner brake phenomenon which appears during a turn of the vehicle on a road surface of a high coefficient of friction because of a rigid connection between the front and rear wheels.

Japanese Utility Model provisional publication Nos. 58-100132 and 58-139226 disclose four wheel drive vehicles having a control system for controlling the changeover between a two wheel drive mode and a four wheel drive mode in accordance with a vehicle's running condition.

A four wheel drive vehicle shown in the document No. 58-100132 is arranged to prevent the driving wheels from spinning by changing over its drive system from the two wheel drive mode to the four wheel drive mode when a rain sensor senses a decrease of the friction coefficient of a road surface due to rain. A four wheel drive vehicle shown in the document No. 58-139226 is arranged to prevent the tight corner braking by changing over its drive system from the four wheel drive mode to the two wheel drive mode when an oil pressure sensor senses a turn of the vehicle of a great steering amount by sensing an oil pressure of a hydraulic power steering system.

However, it is not sufficient to prevent only the wheel spin on the tight corner brake, but it is necessary to prevent both of them. If the teachings of both documents were combined, it would require various sensors such as rain sensor, oil pressure switch and vehicle speed sensor so that the manufacturing cost would be increased and the construction would be complicated.

Furthermore, the four wheel drive vehicles of both documents are disadvantageous in that the vehicle steering stability is impaired by an abrupt change of the steering characteristics due to an abrupt change between the two and four wheel drive modes.

SUMMARY OF THE INVENTION

It is an object of the present invention to provide a four wheel drive control system which can obtain the advantage of the four wheel drive and eliminate the disadvantage of the four wheel drive according to need, with a simple and inexpensive construction.

According to the present invention, a four wheel drive system for a vehicle having an engine and primary and secondary driving wheel pairs comprises transfer, primary and secondary wheel speed sensors and a driving force distribution control means.

The transfer transmits drive torque from the engine to the primary driving wheel pair, and further transmits drive torque from the engine to the secondary driving wheel pair through a transfer clutch which is capable of varying clutch torque transmitted through the transfer clutch by varying the magnitude of a clutch engagement force. The primary and secondary wheel speed sensors sense, respectively, primary wheel rotational speed of the primary wheel pair and secondary wheel rotational speed of the secondary wheel pair.

The driving force distribution control means is connected with the primary and secondary wheel speed sensors for controlling the transfer clutch. The control means controls the clutch torque transmitted through the transfer clutch to the secondary wheels, in accordance with a wheel speed difference remaining after the sensed primary wheel speed is subtracted from the sensed secondary wheel speed.

Preferably, the control means controls a distribution ratio of a driving force of the secondary wheel pair to a driving force of the primary wheel pair by controlling the clutch torque of the transfer clutch in such a manner that the above-mentioned distribution ratio is lower when the above-mentioned wheel speed difference is greater than zero than when the wheel speed difference is smaller than zero.

DETAILED DESCRIPTION OF THE INVENTION

A first embodiment of the present invention is shown in FIGS. 1–5.

Figure 1:
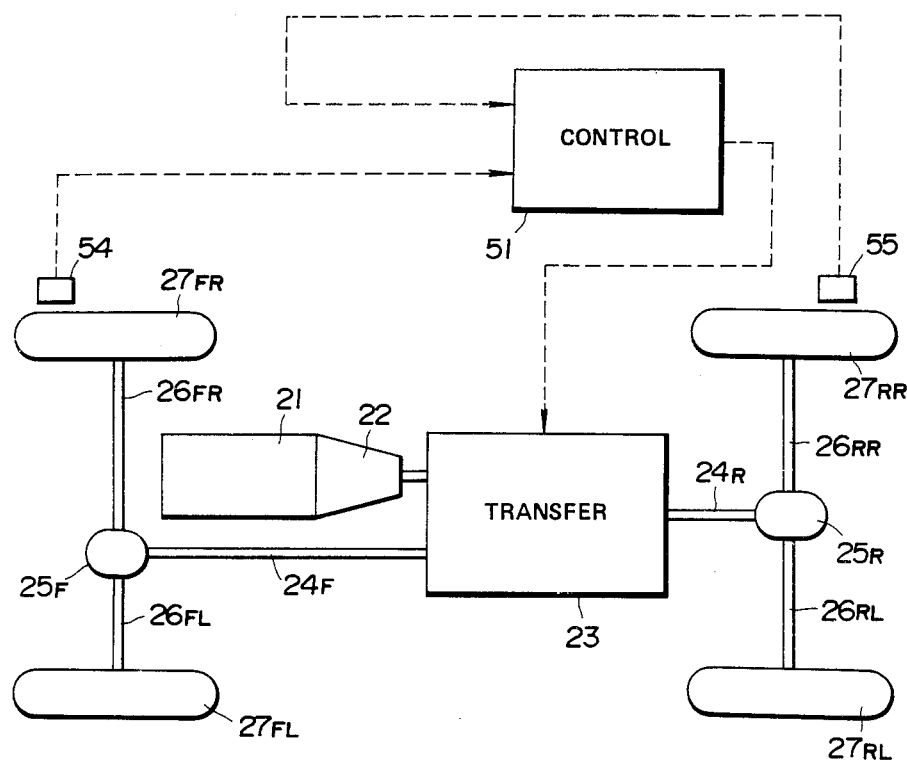
FIG. 1 is a schematic view of a four wheel drive vehicle for showing a first embodiment of the present invention.

A four wheel drive vehicle shown in FIG. 1 has an engine 21, a transmission 22 united with the engine, and a transfer 23 which connects an output shaft of the transmission to a rear wheel propeller shaft 24R and a front wheel propeller shaft 24F. The rear propeller shaft 24R is connected to right and left wheels 27RR and 27RL through a rear differential 25R and right and left axles 26RR and 26RL. The front propeller shaft 24F is connected to right and left front wheels 27FR and 27FL through a front differential 25F and right and left axles 26FR and 26FL.

Figure 2:
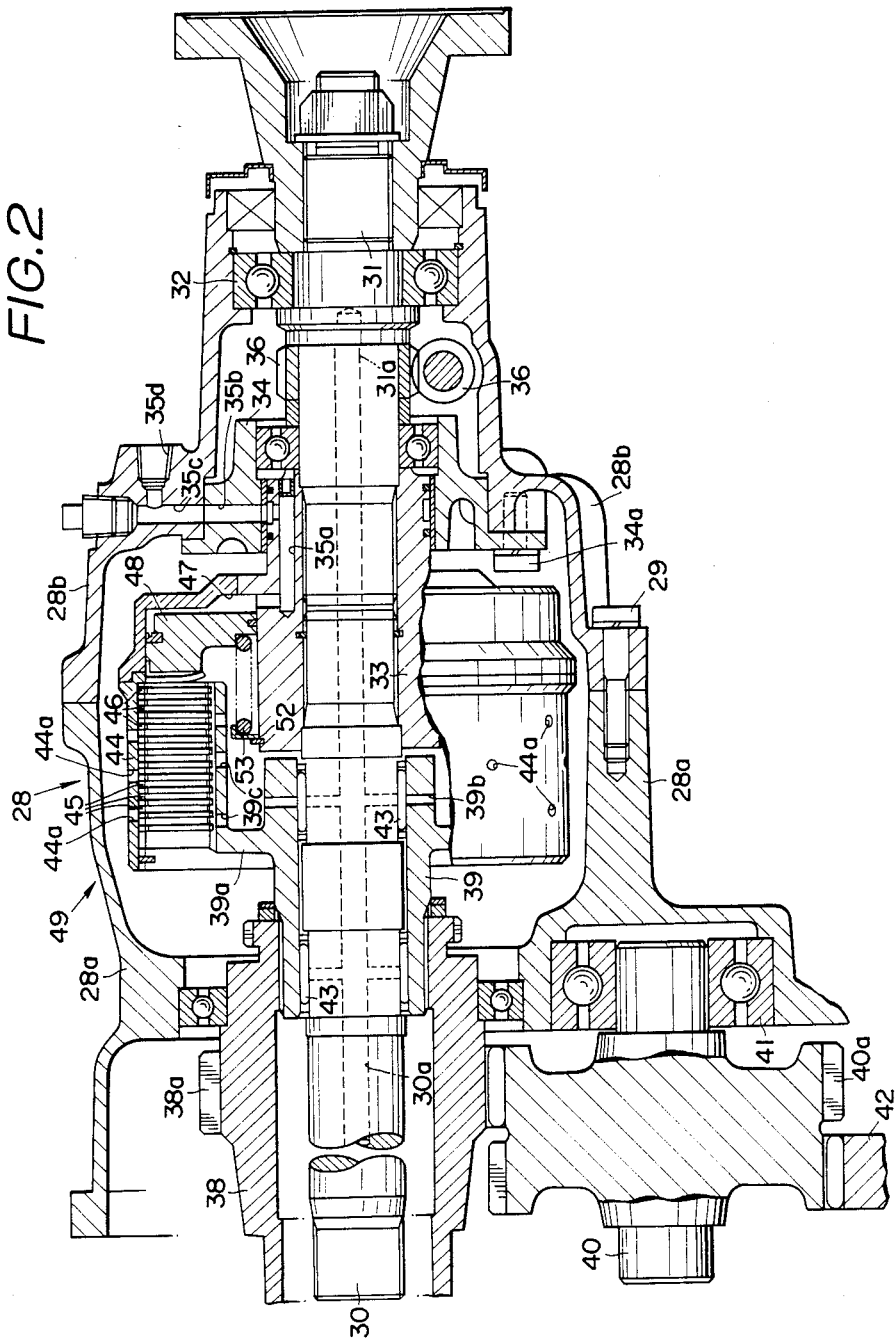
FIG. 2 is a sectional view of a transfer of the vehicle shown in FIG. 1.

As shown in FIG. 2, the transfer 23 has a transfer case 28 consisting of two members 28a and 28b joined together by bolts 29. The case 28 contains a input shaft 30 which is directly connected with the output shaft of the transmission 22. A bearing 32 supports a rear wheel output shaft 31 which is connected with the rear propeller shaft 24R. An internally splined coupling member 33 of a hollow cylindrical shape fits over the ends of the input shaft 30 and the rear wheel output shaft 31, So that both shafts rotate together. The coupling member 33 is rotatably received in a hole of a bearing holder 34 which is fixed to the transfer case 28 by bolts 34a.

The input shaft 30 is encircled coaxially by first and second hollow shafts 38 and 39 which are connected with each other by means of splines. The second hollow shaft 39 is rotatably mounted on the input shaft 30 through one or more needle bearings 43. The first hollow shaft 38 has a drive gear 38a formed on the outer surface. The drive gear 38a is in engagement with a counter gear 40a formed on the outer surface of a counter shaft 40 which is rotatably supported on the transfer case 28 through a bearing 41. The counter gear 40a is in engagement with a driven gear 42 formed in a front wheel output shaft which is connected with the front wheel propeller shaft 24F.

A hydraulic type multiple disc friction clutch (transfer clutch) 49 is provided between the coupling member 33 driven by the input shaft 30, and the second hollow shaft 39. A clutch drum 44 is formed on the outer periphery of the coupling member 33, and a clutch hub 39a is formed on the outer periphery of the second hollow shaft 39. The transfer clutch 49 has an alternating series of driving plates 45 engaging with internal splines of the clutch drum 44 and driven plates 46 engaging with external splines of the clutch hub 39a. A piston 48 of a ring shape is axially slidable. Both of outer and inner periphery of the piston 48 are sealed in a liquid-tight manner to form an oil chamber 47. A spring 53 is disposed under compression between the piston 48 and a retainer 52 fixed to the coupling member 33 for pushing the piston 48 toward the oil chamber 47. The oil chamber 47 is in fluid communication with an oil port 35d of the transfer case 28 via a first oil passage 35a formed in the coupling member 33, a second oil passage 35b formed in the bearing holder 34 and a third oil passage 35c formed in the transfer case 28. When a high pressure oil is supplied to the oil chamber 47 from the oil port 35d through the third, second and first oil passages 35c, 35b and 35a, the piston 48 moves leftwardly as viewed in FIG. 2 against the biasing force of the spring 53 and brings the driving and driven plates 45 and 46 into frictional contact with each other. In this state. the clutch 49 connects the input shaft 30 to the front wheel output shaft to drive the front wheels.

First and second lubricant passages 30a and 31a are formed, respectively, in the input shaft 30 and the rear wheel output shaft 31 for conveying a lubricating oil to the needle bearings 43 and other parts. First, second and third clutch lubricant passages 39b, 39c and 44a are formed, respectively, in the second hollow shaft 39, the hub 39a and the drum 44 for lubricating the driving and driven plates 45 and 46 of the clutch 49. A reference numeral 36 denotes a pinion for speed detection.

As shown in FIG. 1, there is provided a control apparatus 51 for controlling the clutch 49 of the transfer 23. The control apparatus 51 is connected with a front wheel speed sensor 54 for sensing a rotational speed of the front wheels 27FL and 27FR and a rear wheel speed sensor 55 for sensing a rotational speed of the rear wheels 27RL and 27RR. The front wheel speed sensor 54 produces a pulse signal having a frequency (pulse repetition rate) corresponding to the rotational speed (RPM) of the front wheels 27FL and 27FR. The rear wheel speed sensor 55 produces a pulse signal having a frequency (PRR) corresponding to the rotational speed (RPM) of the rear wheels 27RL and 27RR. Both signals are inputted into the control apparatus 51. The front wheel speed sensor 54 may be arranged to sense the rotational speed of the front wheel output shaft of the transfer 23 or the counter shaft 40 of the transfer 23. Similarly, the rear wheel speed sensor may be arranged to sense the rotational speed of the rear wheel output shaft 31 of the transfer 23.

Figure 3:
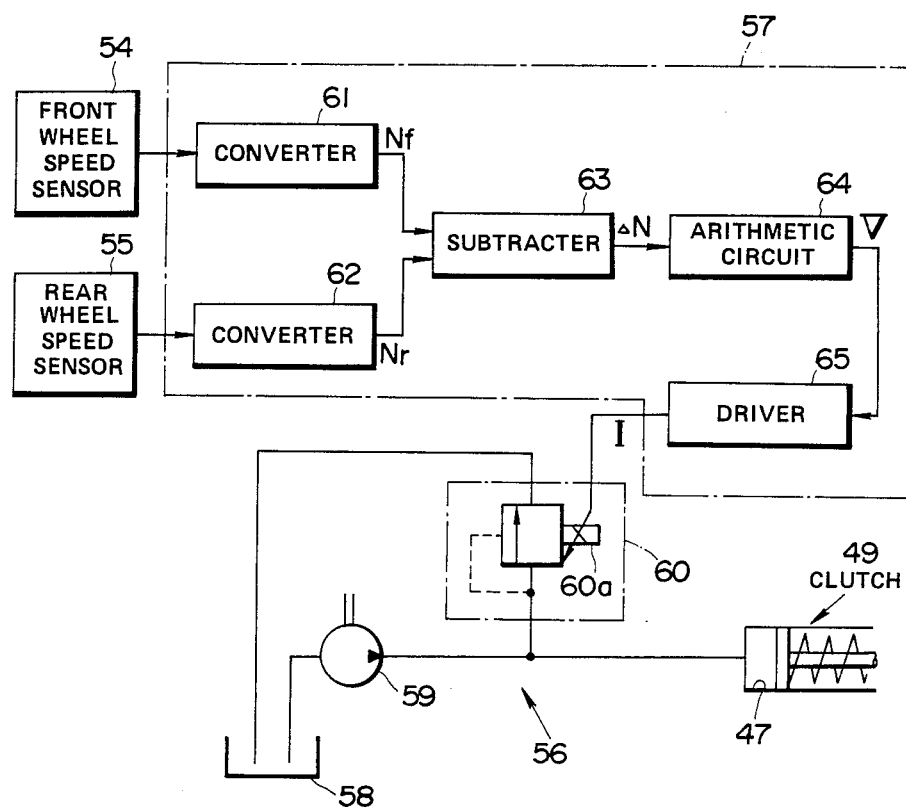
FIG. 3 is a circuit diagram of a control system of FIG. 1.
Figure 4:
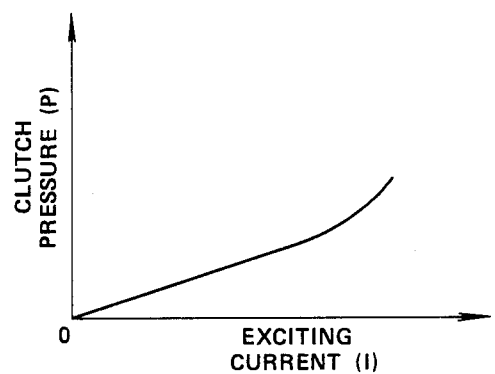
FIG. 4 is a diagram showing a relationship of a clutch pressure to an exciting current of a solenoid valve shown in FIG. 4.

As shown in FIG. 3, the control apparatus 51 has a hydraulic circuit 56 for supplying the pressure oil to the oil chamber 47 of the transfer clutch 49, and an electrical control circuit or unit 57 such as a microcomputer for controlling the oil pressure produced by the hydraulic circuit 56. The hydraulic circuit 56 has an oil pump 59 for pressurizing the oil sucked from a reservoir tank 58. An oil outlet port of the pump 59 is connected to the oil chamber 47 of the transfer clutch 49, and further connected back to the reservoir tank 58 through an electromagnetic or solenoid valve 60. This valve 60 has a solenoid 60a which is connected with the control unit 57. The valve 60 forms fluid communication from the oil chamber 47 and the outlet port of the pump 59 to the reservoir tank 58 through a passage whose opening degree corresponds to the magnitude of the current supplied to the solenoid 60a by the control unit 57. In this way, the electromagnetic valve 60 can vary the oil pressure applied to the oil chamber 47 (clutch pressure) by varying its opening degree under command of the control unit 57. For example, the valve 60 is of a type which has a spool movable in response to the pressure of the discharged oil of the pump 59 and the electromagnetic force, and controls the clutch pressure P supplied to the oil chamber 47 according to a characteristic of the clutch pressure to the exciting current supplied to the solenoid 60a, shown in FIG. 4.

The electric control unit 57 has a first converter (or counter) 61, a second converter (or counter) 62, a subtracter 63, an arithmetic circuit 64 and a driver circuit 65, as shown in FIG. 3. The first converter 6I receives the pulse signal of the front wheel speed sensor 54 and provides a voltage output signal Nf corresponding to the frequency of the input pulse signal. The second converter 62 provides a voltage output signal Nr corresponding to the frequency of the pulse signal of the rear wheel speed sensor 55. The subtracter 63 performs a subtraction between the front wheel speed signal Nf and the rear wheel speed signal Nr. and provides a speed difference signal delta N ($\Delta N$) representing a difference between the front and rear wheel speeds ($\Delta N = Nf - Nr$). The arithmetic circuit 64 receives the speed difference signal $\Delta N$ and provides a control signal V according to the following equation:

$$V = K \cdot \Delta N + V_0$$

where K and $V_0$ are predetermined constants. The driver circuit 65 supplies an exciting current having a value I corresponding to the control signal V, to the solenoid 60a of the electromagnetic valve 60. Thus, the control unit 57 sends the exciting current I corresponding to the speed difference $\Delta N$ between the front and rear wheel speeds, to the solenoid 60a of the valve 60, and by so doing controls the clutch pressure P of the transfer clutch 49 in accordance with the speed difference $\Delta N$, as shown in FIG. 5.

Figure 5:
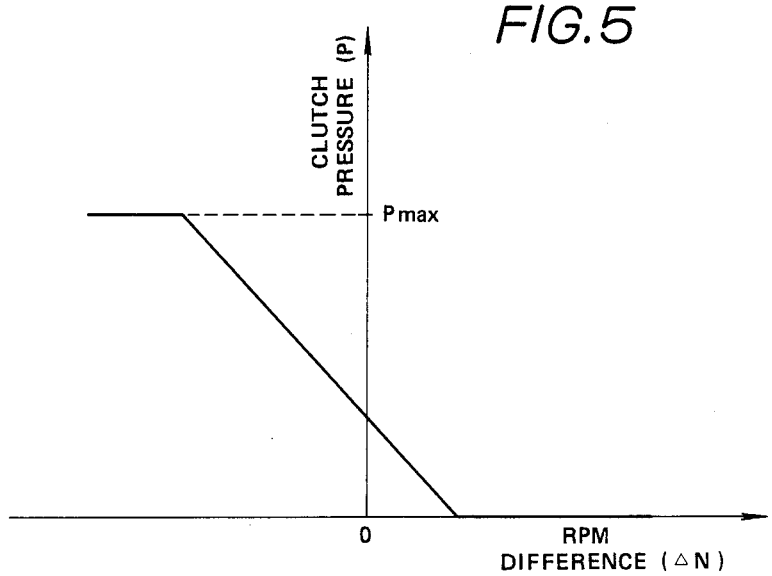
FIG. 5 is a diagram showing a relationship of the clutch pressure to a front and rear wheel speed difference.

As also shown in FIG. 5, the clutch arrangement force of the transfer clutch 49 is decreased linearly from a maximum magnitude to a minimum magnitude as the wheel speed difference increases from a negative limit value to a positive limit value.

This four wheel drive system is operated as follows:

This system controls the clutch pressure P, that is the clutch torque transmitted through the transfer clutch 49, in response to change in the speed difference delta N between the front wheels and rear wheels according to the characteristic shown in FIG. 5.

If the rear wheels 27RL and 27RR start slipping with respect to the road surface and the front and rear wheel speed difference ΔN arises in the state that the vehicle is in a rectilinear motion on a slippery road surface of a low friction coefficient with the drive system in the two wheel drive mode driving only the rear wheels, then the driving force distribution control system of the invention increases the clutch pressure P supplied to the transfer clutch 49 as shown in FIG. 5 to increase the driving force transmitted to the front wheels 27FL and 27FR to a value corresponding to the speed difference ΔN. Therefore, this system can stop the slippage (spin) of the rear wheels 27RL and 27RR relative to the ground by distributing a part of the driving force of the vehicle to the front wheels 27FL and 27FR. After that, the control system prevents the slippage of the rear wheels 27RL and 27RR by varying the driving force transmitted to the front wheels 27FL and 27FR according to the characteristic shown in FIG. 5.

When the vehicle is in a curvilinear motion of a small turning radius on a road surface having a high friction coefficient with the drive system in the four wheel drive mode in which the transfer clutch 49 connects the engine 21 to the front wheels 27FL and 27FR, then the speed difference ΔN between the front and rear wheels arises because the front wheels 27FL and 27FR increase their speed by turning in a larger arc than the rear wheels. and start slipping with respect to the road surface. In response to this speed difference ΔN, the driving force distribution control system of the present invention decreases the torque transmitted through the transfer clutch 49 by decreasing the clutch pressure P in the manner shown in FIG. 5. Thus, this control system prevents the slippage of the front wheels 27FL and 27FR relative to the ground, that is the tight corner braking peculiar to the four wheel drive, by shifting the drive system toward the two wheel drive mode.

The driving force distribution control system of the present invention does not cause an abrupt change of the steer characteristics of the vehicle because this system varies the torque of the transfer clutch 49 in accordance with the front and rear wheel speed difference ΔN as shown in FIG. 5.

The first embodiment enables reduction of the manufacturing cost of the system because the sensors required in the first embodiment are small in number.

Figure 6:
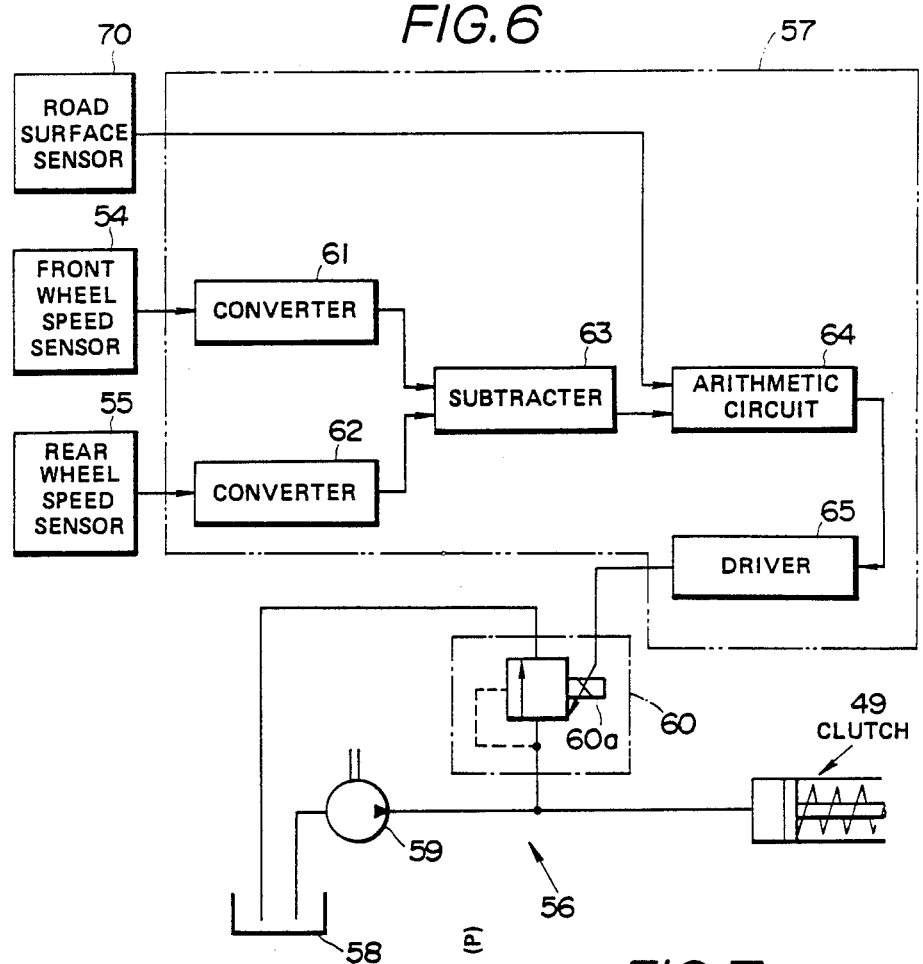
FIG. 6 is a circuit diagram similar to FIG. 3 but showing a second embodiment of the present invention.
Figure 7:
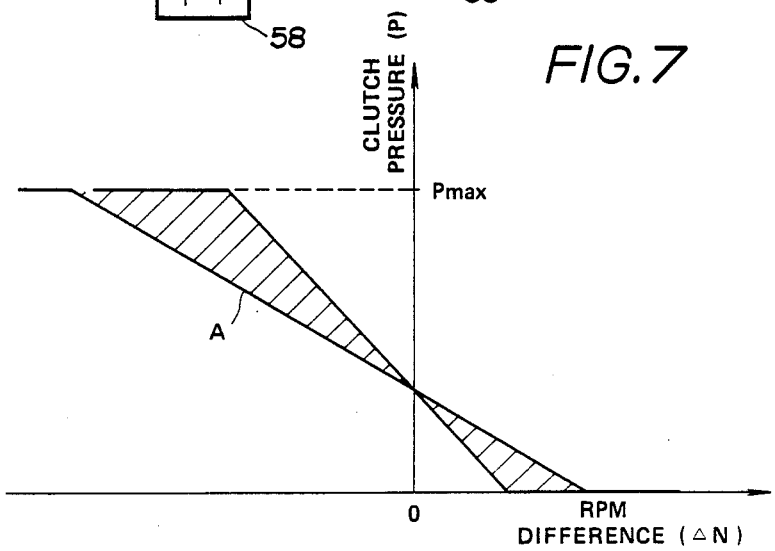
FIG. 7 is a diagram of a relationship between the clutch pressure and the front and rear wheel speed difference for showing the operation of the second embodiment.

A second embodiment of the present invention is shown in FIGS. 6 and 7.

In the second embodiment, as shown in FIG. 6, there is additionally provided a road surface sensor 70 for sensing a road surface condition. For example, the road surface sensor 70 takes the form of an ultrasonic sensor. The road surface sensor 70 is connected to the arithmetic circuit 64 of the control unit 57. The road surface sensor 70 produces a road surface condition signal indicative of a road or ground surface condition such as irregularities or ruggedness, and dampness or humidity (due to rain or snow) of the road or ground surface. The road surface condition signal is inputted into the arithmetic circuit 64. The arithmetic circuit 64 varies the value of the constant K appearing in the above-mentioned equation for obtaining the value of the control signal V, in accordance with the road surface condition signal. The arithmetic circuit 64 determines the control signal V, that is the clutch pressure P, according to the above-mentioned equation by using the thus-adjusted value of the constant K. The driving force distribution control system of the second embodiment varies the transmission torque of the transfer clutch 49 (that is, the clutch pressure P) within a hatched zone in FIG. 7 in accordance with the road surface condition and the front and rear wheel speed difference ΔN.

When the vehicle is running on a road which is covered with snow and has a low friction coefficient, the control system of the second embodiment decreases the absolute value of the constant K, and controls the clutch pressure P according to a characteristic shown by a solid line A In FIG. 7. Therefore, even on a slippery road surface, the control system of the second embodiment can control the driving force distribution in such an adequate manner as to eliminate unnatural feeling of the driver and provide more stable steering characteristics.

The road surface condition sensor of the second embodiment may take the form of a sensor for sensing operation of a windshield wiper of the vehicle by sensing an on state of a wiper switch, or may take the form of a sensor for sensing a normal or vertical acceleration of the vehicle.

What is claimed is:

1. A four wheel drive system for a vehicle having an engine, and primary and secondary driving wheel pairs, comprising:
   a transfer for transmitting torque from said engine to said primary driving wheel pair and transmitting torque from said engine to said secondary driving wheel pair through a transfer clutch capable of varying torque transmitted therethrough by varying a clutch engagement force,
   a primary wheel speed sensor for sensing a primary wheel rotational speed of said primary wheel pair,
   a secondary wheel speed sensor for sensing a secondary wheel rotational speed of said secondary wheel pair, and
   driving force distribution control means connected with said primary and secondary wheel speed sensors for controlling the torque transmitted through said transfer clutch in accordance with a wheel speed difference obtained by subtracting said primary wheel speed sensed by said primary wheel speed sensor from said secondary wheel speed sensed by said secondary wheel speed sensor, said control means continuously controlling the torque transmitted through said transfer clutch as said speed difference increases.

2. A system according to claim 1 wherein said primary wheel pair are rear wheels, and said secondary wheel pair are front wheels, and wherein said driving force distribution control means controls a distribution ratio, which is a ratio of a driving force of said secondary wheel pair to a driving force of said primary wheel pair, such that said distribution ratio is lower when said secondary wheel speed is higher than said primary wheel speed than when said secondary wheel speed is lower than said primary wheel speed.

3. A system according to claim 2 wherein said control means decreases said distribution ratio as said wheel speed difference increases when said wheel speed difference is positive, and increases said distribution ratio as the absolute value of said wheel speed difference increases when said wheel speed difference is negative.

4. A system according to claim 3 wherein said control means decreases said clutch engagement force of said transfer clutch linearly from a maximum magnitude to a minimum magnitude as said wheel speed difference increases from a negative limit value to a positive limit value.

5. A system according to claim 4 further comprising a road condition sensor for sensing a road surface condition, and wherein said distribution control means varies the rate of change of said clutch engagement force with respect to change in said wheel speed difference.

6. A system according to claim 5 wherein said control means decreases the rate of decrease of said clutch engagement force with respect to increase in said wheel speed difference to a smaller value when the road surface is more slippery than normal.

7. A system according to claim 6 wherein said road surface sensor is an ultrasonic sensor.

8. A system according to claim 6 wherein said road surface sensor senses the road surface condition indirectly by sensing a weather condition affecting the road surface condition.

* * * * *